(12) United States Patent
Clark et al.

(10) Patent No.: US 7,309,203 B2
(45) Date of Patent: Dec. 18, 2007

(54) MULTI-MODAL CONTAINER HANDLING SYSTEM

(75) Inventors: Jeffrey A Clark, Adrian, MI (US);
William A Frank, Onsted, MI (US);
Phillip K Ickes, Clinton, MI (US)

(73) Assignee: AIDCO International, Inc., Adrian, MI (US)

( * ) Notice: Subject to any disclaimer, the term of this patent is extended or adjusted under 35 U.S.C. 154(b) by 440 days.

(21) Appl. No.: 10/905,061

(22) Filed: Dec. 14, 2004

(65) Prior Publication Data

US 2006/0182604 A1    Aug. 17, 2006

(51) Int. Cl.
*B65B 21/02* (2006.01)
(52) U.S. Cl. .................... 414/736; 414/810; 294/92
(58) Field of Classification Search ........... 414/416.09, 414/4, 719, 736, 810, 416.05; 294/81.61, 294/87.1, 92
See application file for complete search history.

(56) References Cited

U.S. PATENT DOCUMENTS

| | | | | | |
|---|---|---|---|---|---|
| 2,918,325 | A | * | 12/1959 | Gibson | 294/87.1 |
| 4,494,973 | A | * | 1/1985 | Perry | 65/260 |
| 5,628,409 | A | * | 5/1997 | Thomas | 209/577 |
| 6,003,654 | A | * | 12/1999 | Webber et al. | 198/408 |
| 6,371,717 | B1 | * | 4/2002 | Grams et al. | 414/416.09 |
| 6,685,248 | B2 | * | 2/2004 | Frias et al. | 294/92 |

* cited by examiner

*Primary Examiner*—Charles A Fox
(74) *Attorney, Agent, or Firm*—Howard & Howard Attorneys, P.C.

(57) ABSTRACT

A multi-modal container handling system includes a tool presentation platform mounted to a multi-axis robot. The platform has a number of mechanically locking collets for handling either empty or full containers, and a number of multi-jawed grippers telescopically mounted to the platform for handling empty containers. Both the collets and grippers may be used for moving empty containers, with the collets being used exclusively for inserting full containers into a shipping rack.

16 Claims, 5 Drawing Sheets

MULTI-MODAL CONTAINER HANDLING SYSTEM

BACKGROUND OF THE INVENTION

1. Field of the Invention

The present invention relates to an automated system for loading and unloading containers, particularly large beverage containers, from rack storage.

2. Disclosure Information

The handling of returnable beverage containers, particularly heavier containers such as 5-gallon, blow molded, spring water jugs, presents a challenge to the designers of processing equipment because the weight of the containers fluctuates between a few pounds for an empty container to 45-50 pounds for a full container. Needless to say, the handling of full containers by human operators is a very demanding task, particularly at the high unit handling rates required to service modern filling equipment.

Conventional container handling systems have most often been sized to handle the heaviest containers, e.g., containers that are full. Unfortunately, such heavy duty equipment presents a significant challenge to robotic handling equipment designers because more robust container handling devices tend to have much higher weight, and greater weight requires more expensive structural componentry, including the robots to which container handling end effectors are mounted. The present system uses a combination of separate universal handling devices capable of handling both full and empty containers, and dedicated low unit weight handling devices, used solely for empty containers, to decrease machine cycle time and allow the use of reasonably sized material handling robots for the purpose of shifting containers between shipping racks and production facilities.

SUMMARY OF INVENTION

A multi-modal container handling tool includes a tool presentation platform, a mechanically locking collet mounted to the platform for grasping and handling containers, and a multi-jawed gripper compliantly mounted to the platform, for grasping and handling containers. The multi-jawed gripper may comprise a vacuum gripper having a plurality of vacuum application units which may be mounted telescopically to the tool presentation platform. The multi-jawed gripper may also comprise a pneumatically powered mechanical gripper adapted to lock upon a neck portion of a container.

A multi-modal container handling system according to the present preferably further includes a multi-axis robot base having a robot art mounted to the base, with the multi-modal tool mounted to the arm.

As used herein, the term "multi-modal" means that the present container handling tool and system includes not only mechanically locking collets which are capable of handling containers in both the full and empty conditions and having weights up to and including a maximum design weight, but also grippers compliantly mounted to the platform, exclusively for the purpose of unloading empty containers having weights less than the maximum design weight. These telescopically mounted grippers are mounted upon telescoping actuators such that telescopic retraction is begun once the grippers have engaged one or more empty containers.

According to another aspect of the present invention, a method for employing a robot to unload and load containers from the carrier racks includes the steps of grasping a first number of empty containers, contained within the carrier rack with a number of mechanically locking collets mounted directly upon a robot arm attached to a robot. Then, a second number of empty containers is grasped by a number of grippers mounted telescopically upon the robot arm. Thereafter, the first number of containers and the second number of containers are withdrawn from the carrier rack by moving the robot arm including the mechanically locking collets and the telescopically mounted grippers, in a direction away from the carrier rack. Then, the first number of containers is released by the mechanically locking collets and the second number of containers is released from the telescopically mounted grippers. Finally, a third number of full containers is grasped with the mechanically locking collets and robot arm and collets are used to insert the third number of containers into the carrier rack. In a variation on this method, the empty containers may be withdrawn solely by grippers and not by both the mechanically locking collets and the grippers.

It is an advantage of a system and method according to present invention that the cycle time required to both unload empty containers from a carrier rack and subsequently load full containers in a carrier rack may be reduced because empty containers are removed not only with grippers, but also with mechanically locking collets.

It is a further advantage of a system according to present invention that the system weight of a container handling system may be minimized, while at the same time maintaining the capability of handling and extracting containers from positions deep within a carrier rack.

Other advantages, as well as objects and features of the present invention will become apparent to the reader of this specification.

DETAILED DESCRIPTION OF PREFERRED EMBODIMENTS

Figure 1:
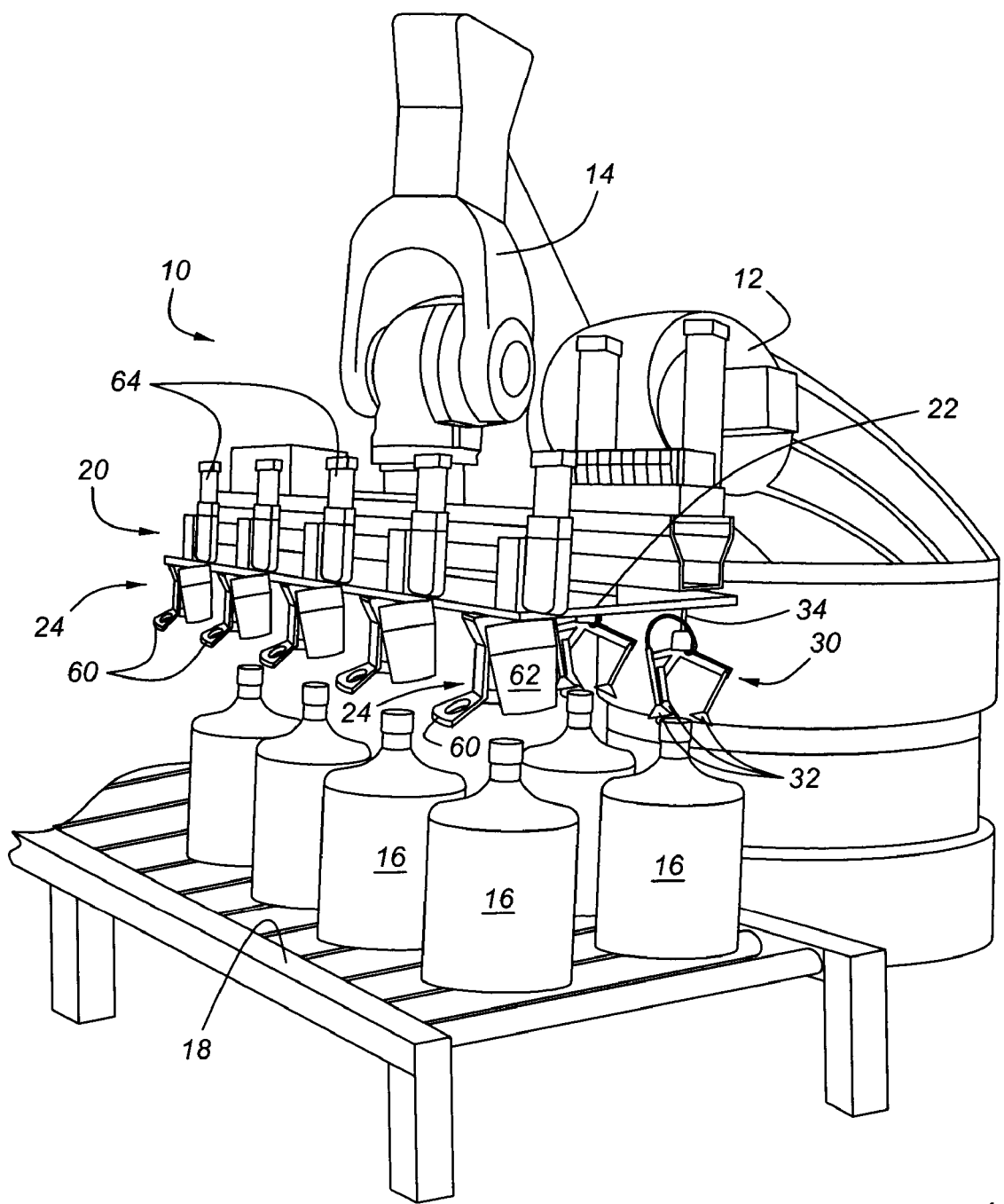
FIG. 1 is a perspective view of a multi-modal container handling system according to the present invention, shown with a number of liquid containers.

FIG. 1 shows a multi-modal container handling system 10 including a multi-axis robot 12 having a robot arm 14 attached thereto. Multi-modal end of arm tool 20, as shown in FIG. 1, includes tool presentation platform 22 which is attached to the end of robot arm 14. Two types of container-handling devices are shown in FIG. 1 as being incorporated in tool 20. These devices are adapted to handle a number of containers, 16, simultaneously. Containers 16 are presented upon conveyor 18 according to material handling techniques which are beyond the scope of this specification.

Multi-modal tool 20 has a number of mechanically locking collets 24 attached thereto. In this case, five mechanically locking collets are used. Each of collets 24 may be attached to a common structural member, as shown. In the event that reparability of tool 20 is a primary concern, the collets may be attached to individual structural segments. Those skilled in the art will appreciate in view of this disclosure that a greater or lesser number of mechanically locking collets 24 could be used according to present invention. Those skilled in the art will further appreciate in view of this disclosure that the illustrated collets are merely exemplary of a class of high weight capacity holding devices which could be mounted to presentation platform 22.

Figure 8:
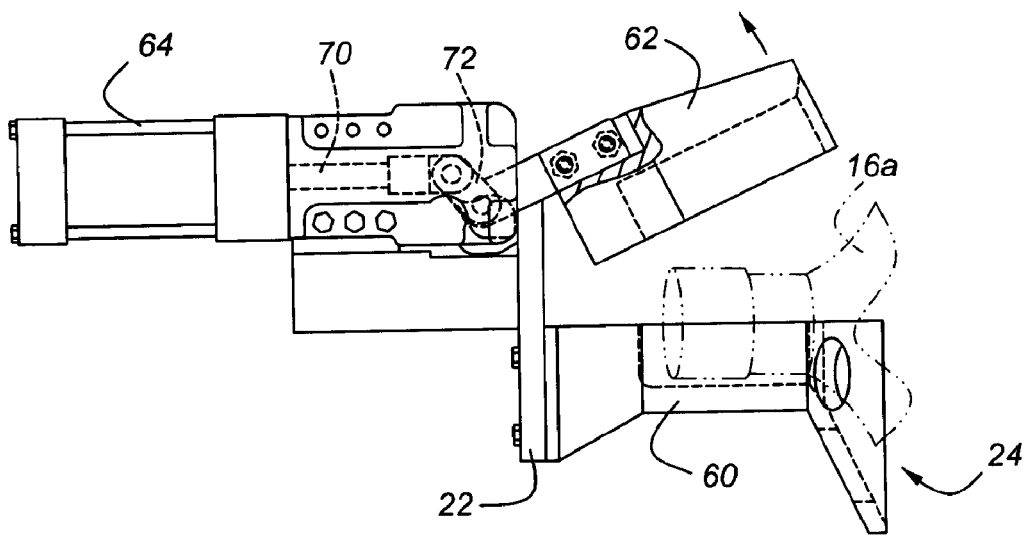
FIG. 8 illustrates a mechanically locking collet according to one aspect of the present invention.

Each mechanically locking collet 24 has the capability of handling not only empty containers 16, but also full containers 16. Detailed construction of collets 24 is shown in FIG. 8. A fixed jaw, 60, is complemented by a movable jaw, 62, which is attached via a toggle link 72 to an air-powered toggle clamp. The present inventors have determined that a DE-STA-CO model 840 MR clamp having an air cylinder 64 and piston rod 70 attached to toggle link 72 is a preferred device for operating movable jaw 62. When movable jaw 62 is closed to abut fixed jaw 60, mechanically locking collet 24 is capable of handling the filled weight of a large water bottle weighing in excess of 45 pounds. This is possible because mechanically locking collets 24 are attached to the neck 16a of containers 16. The load carrying capability of mechanically locking collets 24 is also enhanced because collets 24 are mounted rigidly to tool presentation platform 22.

Figure 6:
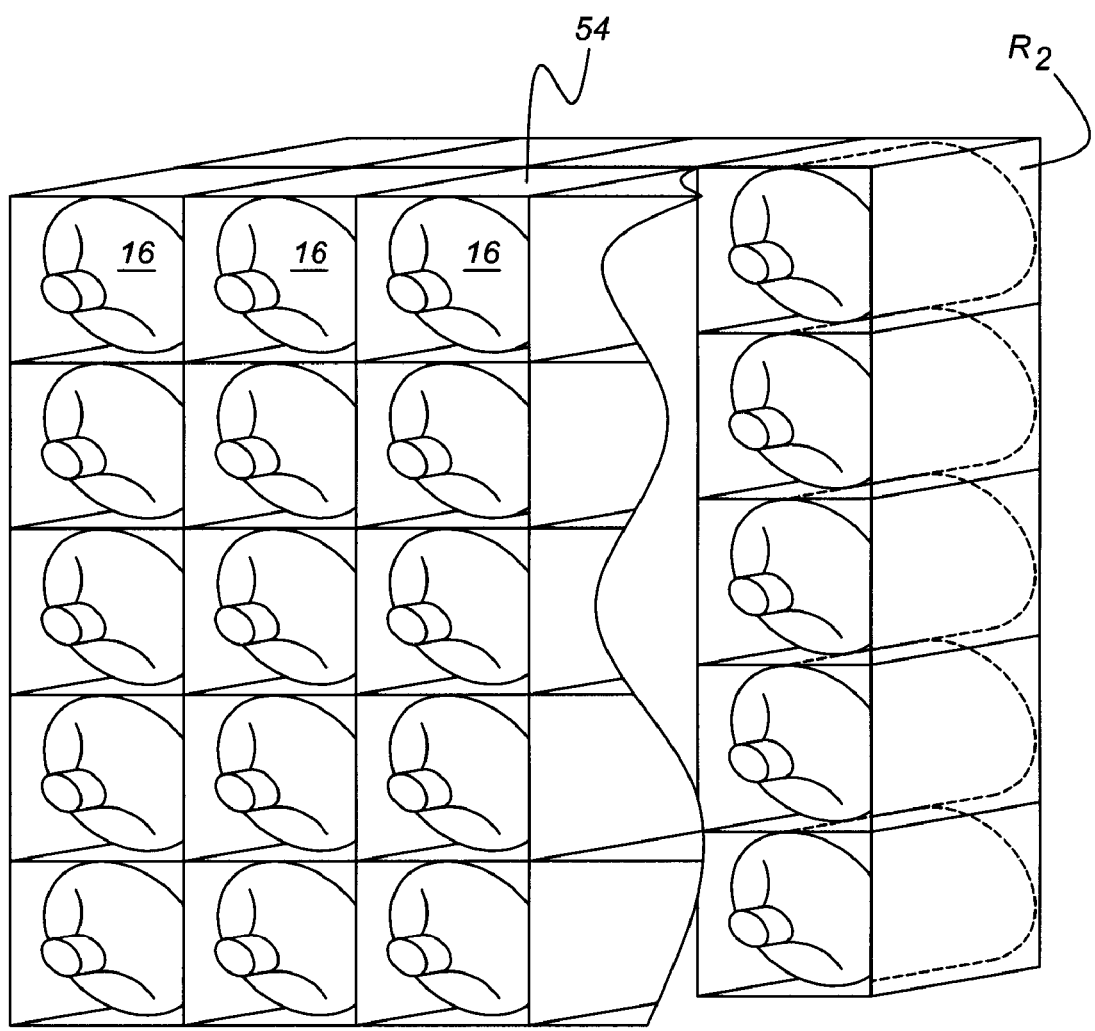
FIG. 6 shows a 3-dimensional shipping rack or carrier useful for practicing the present invention.

Collets 24 are useful not only for loading full containers 16 into carrier rack 54 shown in FIG. 6, but also for removing the first rank of empty containers 16 from carrier rack 54. However, because collets 24 are mounted rigidly, as opposed to telescopically, to tool presentation platform 22, they are not useful for extracting containers 16 which have been deposited within the innermost recesses of a shipping rack, such as location $R_2$ shown in FIG. 6.

Figure 3:
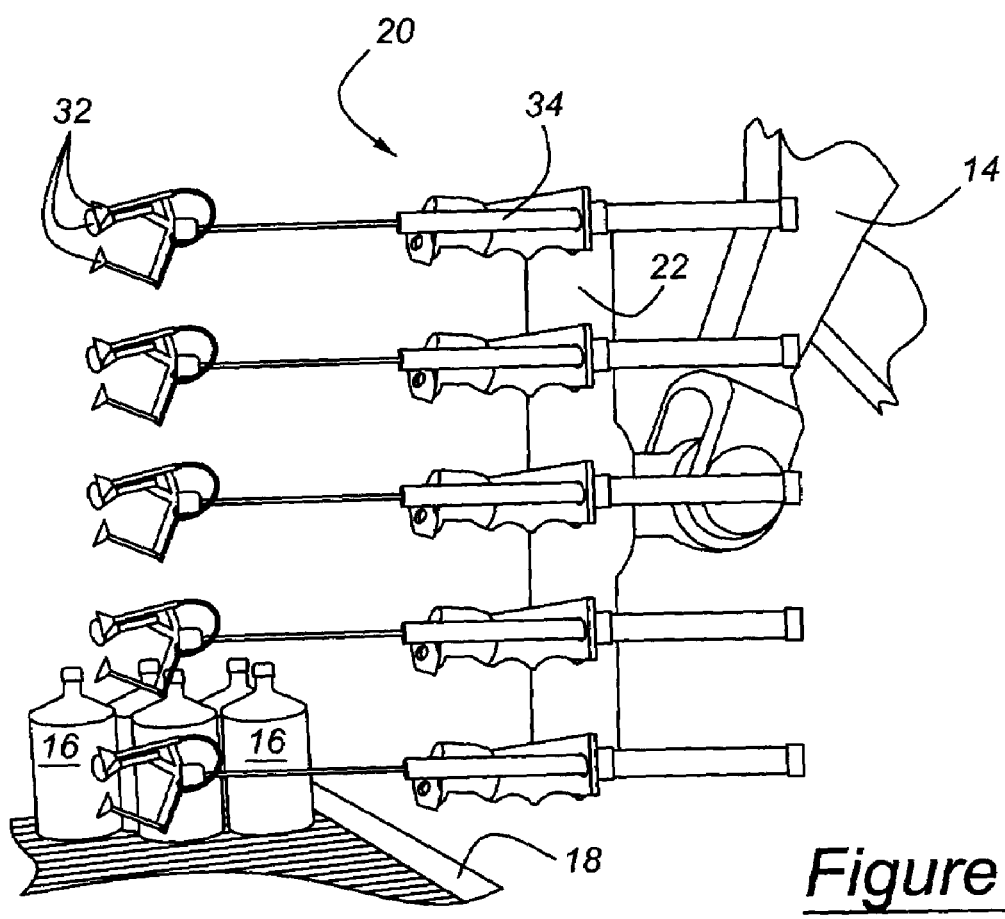
FIG. 3 shows a number of vacuum grippers which are telescopically mounted to a tool presentation platform.
Figure 4:
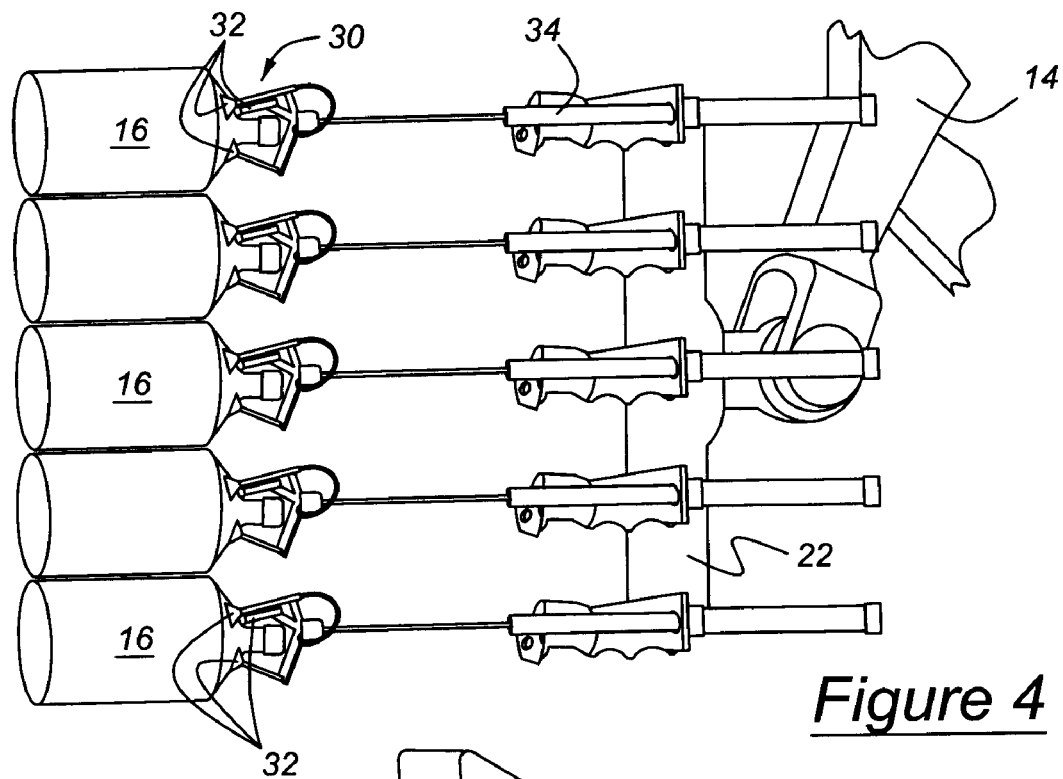
FIG. 4 shows the grippers of FIG. 3, with each holding a container 16.
Figure 5:
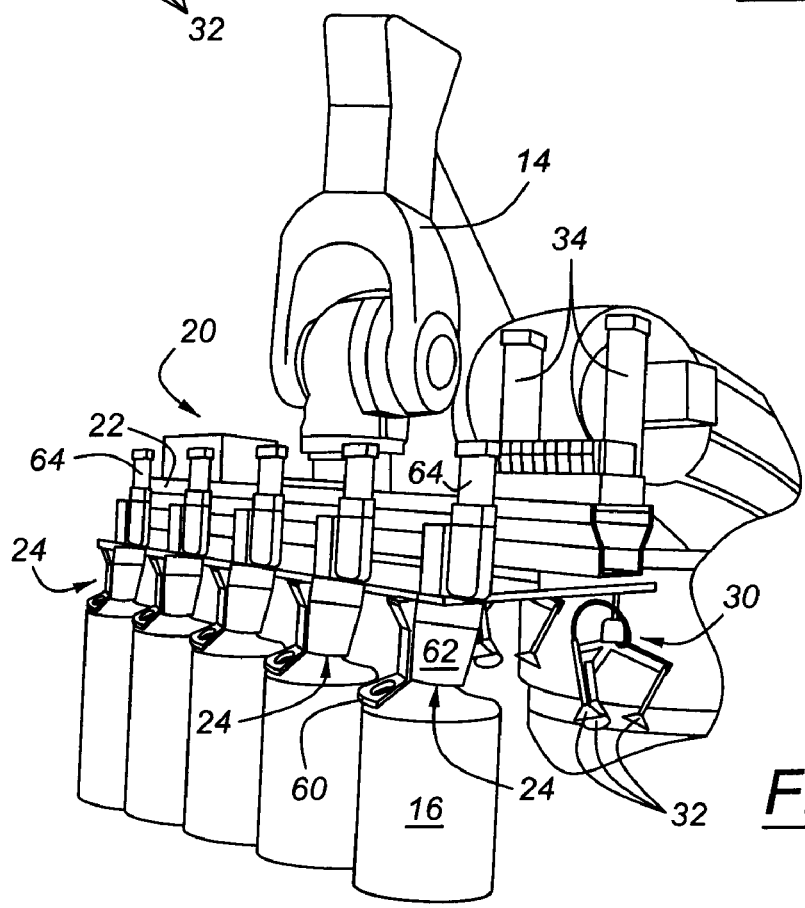
FIG. 5 illustrates the container handling tool of FIG. 1 with five containers being grasped by mechanically locking collets 24.

FIG. 5 illustrates bi-modal tool 20 picking up a total of five full water jugs 16, which will then be inserted into carrier rack 54 (FIG. 6) by robot 12 and robot arm 14. Note in FIG. 5 that no jugs are attached to grippers 30. Grippers 30 differ from collets 24 in at least two ways. First, as shown in FIG. 4, grippers 30 are attached telescopically to tool presentation platform 22. Telescopic mounts 34 of grippers 30 may either be pneumatic or hydraulic or electrically driven such as by means of lead screws or linear bearing/ motors combinations or yet other types of telescoping load-bearing devices known to those skilled in the art and suggested by this disclosure. As shown in FIG. 4, grippers 30 are handling a total of five containers 16, which are empty containers, and which are attached via vacuum application units 32. Three such vacuum application units 32 are used in each of grippers 30 in the embodiment of FIG. 4, which is also shown in FIGS. 1 and 3. Because of their telescopic mounting, grippers 30 do not have the same weight-bearing capacity as collets 24. However, as described more fully below, telescopic mounting permits grippers 30 to remove empty containers 16 from the inner recesses of shipping/ storage racks 54.

Figure 2:
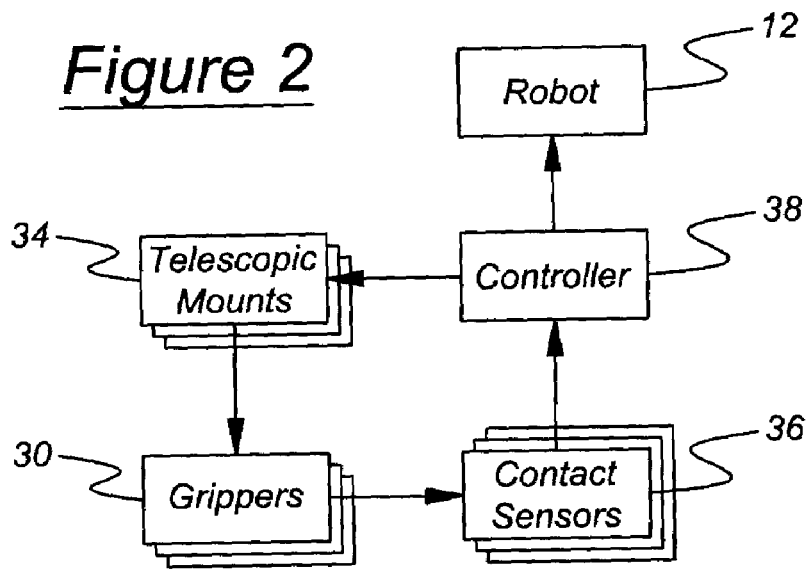
FIG. 2 is a block diagram of a system according to the present invention.

Vacuum application units 32, which are shown more precisely in FIG. 3, are furnished with vacuum through a conventional pump and valve system which is not shown. When robot arm 14 and telescopic mounts 34 engage vacuum application units 32 with a container 16 in the orientation shown in FIG. 4, vacuum will build within the vacuum supply system when vacuum application units 32 are sealed upon the upper surface of container 16. This buildup of vacuum will trip a vacuum-sensitive contact sensor, 36, shown in FIG. 2 and cause a controller, 38, as also shown in FIG. 2, to operate telescopic mounts 34 so as to retract bottles 16 from carrier rack 54. In essence, contact sensor 36 used with the embodiment of FIGS. 1, 3, 4 and 5 is a vacuum sensor which provides a signal to controller 38 when a vacuum within the supply lines extending to vacuum application units 32 increases as a result of the vacuum-tight engagement of vacuum application units 32 with the upper surfaces of bottles 16. A sensor system is not needed to operate collets 24 because programming of robot 12, including robot arm 14, may be used to precisely position collets 24 for the pick-up, delivery and release of containers 16 according to the present invention.

Figure 7:
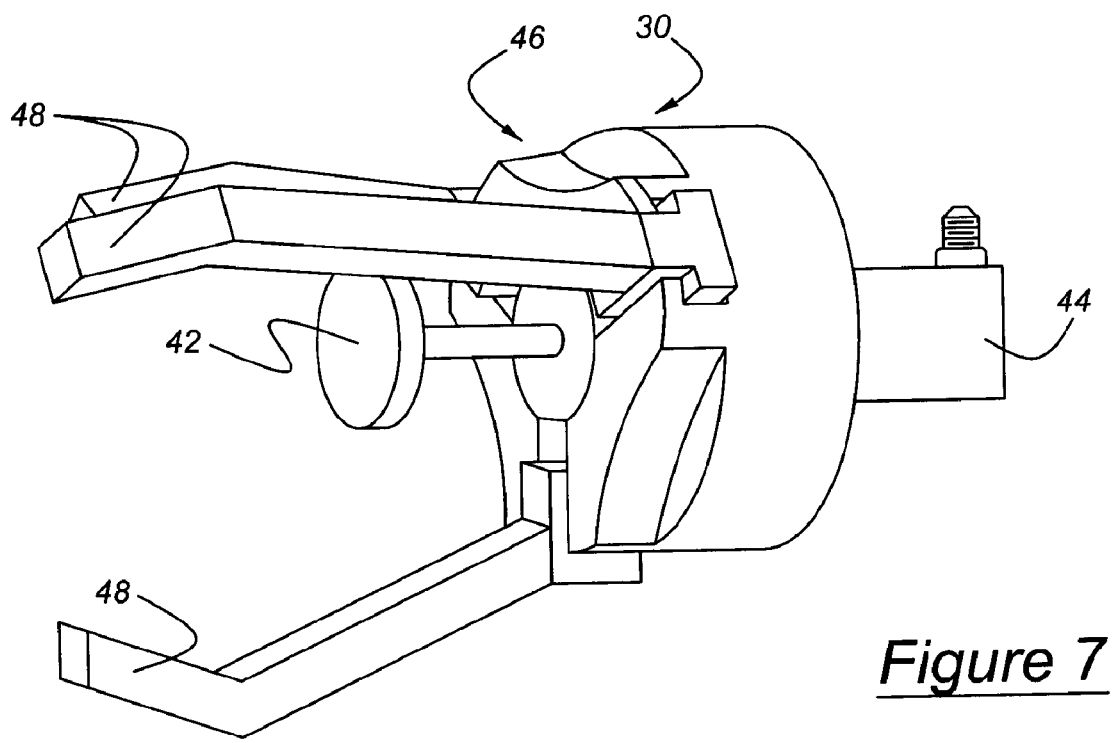
FIG. 7 illustrates a mechanical gripper for use with a system according to the present invention.

FIG. 7 illustrates the second type of multi-jawed pneumatically powered mechanical gripper according to another aspect of the present invention. In essence, both the gripper shown in FIG. 7, as well as the gripper shown first in FIG. 1, are pneumatically powered. In the case of grippers shown in FIG. 1, the pneumatics are applied directly to the work-piece, in this case container 16, whereas in the unit shown in FIG. 7, gripper uses a gripper device commercially by phd, inc. as gripper model GRT X3X. Gripper 46 uses a body to which a plurality of fingers 48 are attached. Plunger 42 is used to operate air valve 44 so as to close fingers 48 upon the neck 16a of a container 16.

Taken together, plunger 42 and air valve 44 comprise one of sensors 36 shown in FIG. 2 inasmuch as the air signal from valve 44 is used to inform controller 48 that jaws 48 are closed, such that gripper 30 should be withdrawn telescopically by mount 34, robot arm 14 and robot 12 from carrier rack 54.

The multi-modal capability of tool 20 is enhanced by the previously described ability of collets 24 to handle not only full containers 16, but also empty containers 16. Accordingly, when a full carrier rack 54 arrives at the location of container handling system 10, collets 24 and grippers 30 may be used simultaneously to remove containers 16 located at the open end of rack 54. This will reduce the cycle time which would otherwise be needed to unload rack 54 because the unloading process will not rely solely upon grippers 30. Thus, a number of empty containers 16 will be grasped by collets 24 and additional containers will be grasped by grippers 30. Then, robot arm 14 and robot 12 will remove the grasped containers 16 from shipping rack 54. Once the layer of containers nearest the open end of shipping rack 54 has been removed, grippers 30 will be extended upon telescopic mounts 34 into the second rank shown as $R_2$ in FIG. 6. Once the second rank of containers has been removed, full containers 16 may be inserted by using collets 24 to first fill the outside rank of rack 54, and once the outside rank is full, robot 12 and robot arm 14 may be used along with collets 24 to push the previously loaded container 16 into rank $R_2$ so as to allow complete filling of rack 54. This is accomplished by using additional full containers 16 as monitors or rams to push previously loaded containers into their final position in rank $R_2$. In this manner, more than the illustrated two ranks of containers 16 may be accommodated within shipping rack 54. Each shipping rack 54 may be used not only for warehouse storage, but also for moving containers 16 onto a delivery truck.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. A multi-modal container handling tool for handling full and empty containers, comprising:
   a tool presentation platform;
   a handling device, rigidly mounted to said platform, adapted to grasp and handle at least one of the full and empty containers; and
   a second handling device, compliantly mounted to said platform, adapted to grasp and handle the containers having weights less than the full container, said second handling device comprising a multi-jawed gripper mounted telescopically to said tool presentation platform.

2. A multi-modal container handling tool according to claim 1, wherein said handling device comprises a mechanically locking collet.

3. A multi-modal container handling tool according to claim 2, wherein said mechanically locking collet is adapted to lock upon a neck portion of a container.

4. A multi-modal container handling tool according to claim 3, wherein said multi-jawed gripper is adapted to lock upon an upper portion of a container.

5. A multi-modal container handling tool according to claim 4, wherein said multi-jawed gripper is adapted to lock upon a neck portion of the container.

6. A multi-modal container handling tool according to claim 1, wherein said multi-jawed gripper comprises a vacuum gripper.

7. A multi-modal container handling tool according to claim 6, wherein said multi-jawed gripper comprises a vacuum gripper having a plurality of vacuum application units.

8. A multi-modal container handling tool according to claim 1, wherein said multi-jawed gripper comprises a pneumatically powered mechanical gripper.

9. A multi-modal container handling tool according to claim 1, wherein the containers comprise bottles for containing liquid.

10. A multi-modal container handling system, comprising: a multi-axis robot base; an arm mounted to said base; and a multi-modal tool mounted to said arm, with said tool comprising: a tool presentation platform; a plurality of mechanically locking collets, mounted directly to said tool presentation platform, for simultaneously grasping a plurality of full containers about structures built into said containers; and a plurality of telescopically mounted multi-jawed grippers, extending telescopically from said platform, for extending and grasping a plurality of empty containers, with said telescopically mounted grippers retracting telescopically once said plurality of empty containers has been grasped.

11. A multi-modal container handling system according to claim 10, wherein each of said telescopically mounted grippers comprises a vacuum unit for locking upon an external surface of a container, with said grippers being mounted to a telescoping actuator such that said telescopic retraction is begun once a vacuum has been pulled between said vacuum unit and one of said plurality of empty containers.

12. A multi-modal container handling system according to claim 10, wherein each of said telescopically mounted grippers comprises a pneumatically powered mechanical gripper for locking upon an external surface of a container, with said grippers being mounted to a plurality of telescopic actuators such that said telescopic retraction of each of said grippers is begun once any particular gripper has contacted one of said plurality of empty containers.

13. A multi-modal container handling system according to claim 10, wherein each of said telescopically mounted grippers comprises a plurality of vacuum units for simultaneously locking upon an external surface of a container and triggering retraction of the telescopic mount.

14. A multi-modal container handling tool according to claim 10, wherein said full and empty containers comprise bottles for containing liquid.

15. A method for employing a robot to unload and load containers from a carrier rack, comprising the steps of: grasping at least a first plurality of empty containers, contained within said carrier rack, with a plurality of mechanically locking collets mounted directly upon a robot arm attached to said robot; grasping at least a second plurality of empty containers, contained within said carrier rack, with a plurality of grippers mounted telescopically upon said robot arm; withdrawing said first plurality of containers and said second plurality of containers from said carrier rack by moving said robot arm, with said mechanically locking collets and said telescopically mounted grippers, in a direction away from said carrier rack; releasing said first plurality of containers from said mechanically locking collets; releasing said second plurality of containers from said telescopically mounted grippers; grasping at least a third plurality of full containers with said mechanically locking collets; and using said robot arm and said mechanically locking collets to insert said third plurality of containers into said carrier rank.

16. A method for employing a robot to unload and then load containers from a carrier rack, comprising the steps of: grasping at least a first plurality of empty containers with a plurality of grippers mounted telescopically upon a robot arm; withdrawing said first plurality of containers from said carrier rack by moving said robot arm and said grippers in a direction away from said carrier rack; grasping at least a second plurality of full containers with a plurality of mechanically locking collets mounted directly upon said robot arm; and using said robot arm and said mechanically locking collets to insert said second plurality of containers into said carrier rack.

* * * * *

UNITED STATES PATENT AND TRADEMARK OFFICE
CERTIFICATE OF CORRECTION

PATENT NO. : 7,309,203 B2  
APPLICATION NO. : 10/905061  
DATED : December 18, 2007  
INVENTOR(S) : Jeffrey A. Clark, William A. Frank and Phillip K. Ickes It is certified that error appears in the above-identified patent and that said Letters Patent is hereby corrected as shown below:

Column 5, line 25, please delete "a" and replace with --the--.

Column 5, line 25, please delete "the" and replace with --a--.

Column 6, line 41, please delete "rank" and replace with --rack--.

Signed and Sealed this

Sixth Day of May, 2008

JON W. DUDAS  
*Director of the United States Patent and Trademark Office*